United States Patent [19]

Usui et al.

[11] 4,195,720
[45] Apr. 1, 1980

[54] COUNTER SHAFT AUTOMATIC POWER TRANSMISSION

[75] Inventors: Keizaburo Usui; Isao Hayama, both of Yokohama, Japan

[73] Assignee: Nissan Motor Company, Limited, Yokohama, Japan

[21] Appl. No.: 817,095

[22] Filed: Jul. 19, 1977

[30] Foreign Application Priority Data

Jul. 20, 1976 [JP] Japan .................... 51-86969

[51] Int. Cl.² ............... F04B 49/00; B60K 29/00
[52] U.S. Cl. .................... 192/0.092; 74/843; 60/DIG. 2; 417/38; 192/3.58
[58] Field of Search ........... 192/0.092; 74/843, 856, 74/879; 60/DIG. 2; 417/38

[56] References Cited

U.S. PATENT DOCUMENTS

| | | | |
|---|---|---|---|
| 3,756,358 | 9/1973 | Espenschied et al. | 192/3.58 |
| 3,938,409 | 2/1976 | Uozumi | 74/869 |
| 3,940,931 | 3/1976 | Renfro et al. | 60/DIG. 2 |

*Primary Examiner*—Benjamin Wyche
*Attorney, Agent, or Firm*—Schwartz, Jeffery, Schwaab, Mack, Blumenthal & Koch

[57] ABSTRACT

A motor operatively connected to a pump which provides the transmission hydraulic control system with pressurized fluid is activatable automatically in response to insufficient pressure being stored in an accumulator when the ignition switch is closed and by a button switch operated by a button disposed on the gear shift lever when the ignition switch is open and insufficient pressure prevails in said accumulator whereby it is possible to shift gears even when the engine is stopped.

5 Claims, 10 Drawing Figures

COUNTER SHAFT AUTOMATIC POWER TRANSMISSION

BACKGROUND OF THE INVENTION

1. Field of the Invention

This invention relates to a countershaft type automatic transmission and more particularly to such a transmission which has a circuit provided therein which permits shifting of gears even when the engine is stopped.

2. Description of the Prior Art

Automatic power transmissions which are presently in wide use in motor vehicles generally utilize torque converters and two, three of four forward-speed transmission mechanisms using planetary or epicyclic gear trains. The torque converters connected thereto are inherently subject to slippage between the driving and driven members thereof which results in the deterioration of the torque transmission efficiency and accordingly results in an undesirable increase in fuel consumption. Furthermore the planetary gear trains and the associated clutches and brakes are not only intricate in construction and therefore expensive but lack the ability to produce an engine braking effect during deceleration of the vehicle. This when coupled with the inability to readily select gears manually during acceleration can cause the driver to have some misgivings with regard to controlling his or her vehicle.

To overcome the above-mentioned problem an automatic countershaft power transmission for an automotive vehicle has been developed which includes an internal combustion engine including a mixture supply system having a throttle valve to be operated by an accelerator pedal, comprising, in combination, a countershaft transmission gear assembly including a transmission input shaft, a transmission mainshaft substantially in line with the transmission input shaft, a countershaft substantially parallel with the transmission mainshaft and a plurality of gears on the transmission input shaft, mainshaft and countershaft and arranged to be capable of producing a neutral gear, a plurality of forward-drive gears and at least one reverse-drive gear; a clutch assembly disposed between the output shaft of the engine and the input shaft of the transmission gear assembly and having a coupled condition providing driving connection from the output shaft of the engine to the input shaft of the transmission gear assembly and an uncoupled condition disconnecting the input shaft of the transmission gear assembly from the output shaft of the engine; electrically operated clutch control valve means operative to actuate the clutch assembly selectively into the uncoupled condition or into the coupled condition at stepwise variable rates; electrically operated throttle-valve control means operative to control the throttle valve in the mixture supply system independently of the accelerator pedal when the clutch assembly is in the uncoupled condition; mechanical linkage means engageable with predetermined ones of the gears in the transmission gear assembly for selectively producing one of the neutral, forward-drive and reverse-drive gears; an electrically-operated hydraulic control system which is drivingly connected to the mechanical linkage means for operating the linkage means to selectively produce one of the neutral, forward-drive and reverse-drive gears in the transmission gear assembly; and an electric control circuit responsive to predetermined operational variables of the vehicle for producing electrical signals to control the clutch control valve means, throttle-valve control means and hydraulic control system depending upon the aforesaid operational variables. The control circuit is preferably so arranged as to be responsive to the uncoupled condition of the clutch assembly for actuating the throttle-valve control means to move the throttle valve in the mixture supply system toward the fully closed position thereof independently of the accelerator pedal when the clutch assembly is in the uncoupled condition. The above-mentioned forward-drive gears may include at least three forward-drive gears, in which instance the hydraulic control system for the transmission gear assembly comprises fluid-operated first and second control cylinders each having a piston which is operatively connected to the aforesaid mechanical linkage means and which is movable between three different positions allocated to predetermined ones of the neutral, forward-drive and reverse-drive gears.

The just described transmission not only solved the aforementioned drawbacks but solved to some extent one other drawback encountered by the planetary gear type transmission, namely the need for a parking brake. By engaging the countershaft type gear box in either low or reverse gear the vehicle is secured when parked without the necessity of a separate and usually complex mechanical locking pawl or the like to prevent undesired rolling of the vehicle from its parked position.

However one shortcoming is encountered in the above transmission when using low or reverse gear as a parking brake and that is once the engine is stopped no further changing of gears is possible because the supply of pressurized fluid via which the gear changes are realized stops. Thus if the car is parked and the engine stopped by opening the ignition switch and the driver has forgotten to engage the transmission in either low or reverse gear, then the engine must be restarted specifically for the purpose of selecting a more appropriate gear. This is of course troublesome and there thus remains a need for a transmission which provides all the advantages of the aforedescribed countershaft type automatic transmission but in which the gears can be shifted even when the engine is stopped.

SUMMARY OF THE INVENTION

Thus a countershaft type transmission of the aforedescribed nature has been developed which includes a motor connected to the pump which supplies the pressurized fluid to the transmission and a circuit integrated with the normal control circuit which permits the activation of the pump if insufficient pressure remains in the accumulator of the system. This circuit includes a button switch mounted on the gear shift lever which permits the aforementioned activation if the ignition switch is open whereby adequate pressure is developed and gear shifting is facilitated.

Thus it is an object of the present invention to provide a countershaft type automatic power transmission in which the gears can be unfailingly shifted even when the engine of the vehicle is stopped.

It is another object of the present invention to provide a countershaft type automatic transmission in which a button switch mounted on the gear shift lever permits the activation of a motor operatively connected to the pump, which supplies the pressurized fluid to the transmission, when the ignition switch is open and the engine is stopped.

BRIEF DESCRIPTION OF THE DRAWINGS

Other features, advantages and objects of the present invention will become more clearly understood as the description proceeds taken in conjunction with the accompanying drawings in which.

It is to be noted that FIGS. 4, 5, 6, 7A and 7D carry different numerals from FIGS. 1 to 3 and that the former figures correspond directly to FIGS. 1, 6, 7, and 3A to 3D of the applicants copending U.S. Application No. 788,549; the numerals have been retained for ease of cross reference to said copending application.

Figure 1:
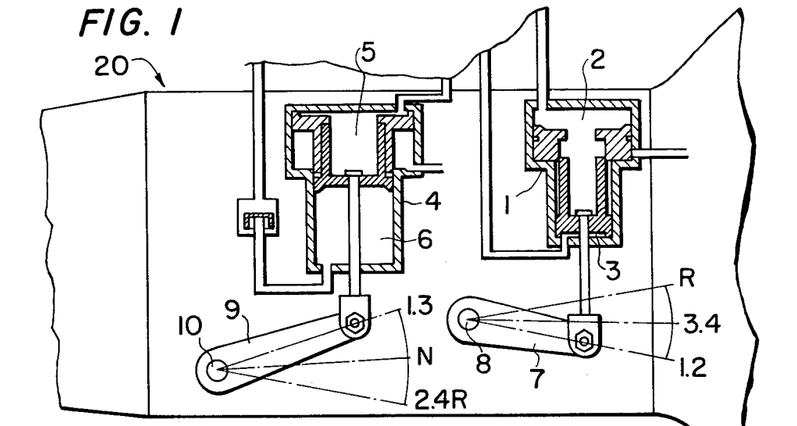
FIG. 1 is a schematic representation of a portion of the electrically operated hydraulic control system of a countershaft type transmission which shows the hydraulic shift and select cylinders thereof in partial section.

FIG. 1 shows schematically and in partial section part of the electrically controlled or operated hydraulic control system which functions to selectively engage the gears of the countershaft transmission assembly denoted by the numberal 20. As shown two cylinders, the select cylinder 1 and the shift cylinder 4 (which respectively correspond to cylinders 242 and 240 in FIG. 6) are arranged to, as will be briefly set forth hereinafter, be operated by supplying the hydraulic chambers 2 and 3 of the select cylinder and the hydraulic chambers 5 and 6 of the shift cylinder with pressurized fluid from a controlled source (shown in FIG. 6). Via reciprocation of the pistons in the cylinders the select shaft 8 and the shift shaft 10 are rotatable via the cranking action of the select lever 7 and the shift lever 9 which are fixedly connected to the aforementioned shafts. This latter described rotation of course produces the appropriate movement of the gears depicted in FIGS. 7A to 7D.

A very adequate description of the construction and the operation of the countershaft transmission to which this invention is directed is given in the aforementioned copending application No. 788,549. Direct reference to this application will be made in the latter stages of this disclosure taken in conjunction with FIGS. 4 to 7D. However at this time no further description of the construction and operation of the gear assembly and the hydraulic control system operatively connected thereto will be given for brevity and so full attention can be given to the mechanism and the circuitry which is novel and solves the shortcomings inherent therein.

Figures 2, 3:
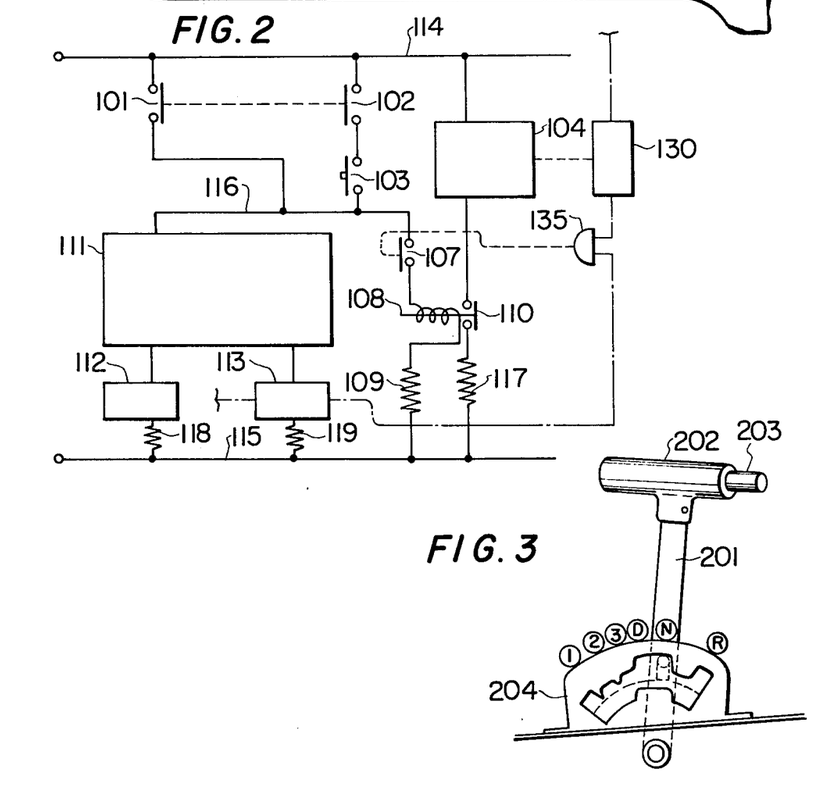
FIG. 2 is a circuit diagram showing the integration of the circuit with the normal control circuit which characterizes the invention.
FIG. 3 is a schematic perspective view of a gear shift lever provided with a button switch which permits the activation of the circuit shown in FIG. 2 when the ignition switch is open.

Referring now to FIG. 2 which shows a circuit diagram wherein the numerals 114 and 115 denote positive and negative power supply lines respectively viz., lines which are connected to the positive and negative terminals of a source of electromotive force such as a battery. The numeral 101 denotes an ignition switch which is operatively connected to a second switch 102 as it will be referred to for simplicity. Both switches are connected via one of their terminals to the positive power supply line 114. It will be noted that the switches 101 and 102 are so arranged that when the ignition switch 101 is closed the second switch is open and vice versa. An intermediate power line 116 is arranged to electrically connect one terminal of the ignition switch 101, an electric control circuit 111 which will be further explained in the latter stages of this disclosure taken in conjunction with FIG. 5, a button switch 103 and pressure switch 107. The two switches 103 and 107 are as shown connected so that the button switch 103 is connected between the intermediate power line 116 and the second switch 102 and the pressure switch 107 is connected in series with a solenoid coil 108 and a resistor 109. The resistor 109 is connected to the negative power supply line 115. Also connected in series between the positive and negative power supply lines 114 and 115 are a motor 104, a switch 110 (sensitive to the energization or deenergization of the aforementioned solenoid coil 108) and a resistor 117. The switch 110 is arranged to be closed on energization of the coil 108 and open during the period when it is deenergized. Connected in parallel between the aforementioned electric control circuit and the negative power supply line are an electrically operated clutch control device 112 and an electrically operated hydraulic control device 113. As shown, the latter, i.e., the electrically operated hydraulic control device 113, is connected to the pump 130 and the accumulator 135. The pump is of course connected to the motor 104 as shown to be drivable thereby. Part of the aforementioned electrically operated hydraulic control device 113 is of course shown in FIG. 1 as previously described. The electrically controlled clutch control device 112 is connected to a source of vacuum (not shown) such as the induction manifold downstream of the throttle valve to be operable driven thereby. A further description will be given in the latter stages of this disclosure taken in conjunction with FIGS. 6 and 4, respectively.

Now before considering the operation of the above described circuitry let us look at FIG. 3 which shows a gear shift lever 201, in this case a "T" bar type, which is arranged to cooperate with a guide plate 204 for locating same in appropriate gear selecting positions. A button 203 is shown to protrude from the end of the handle 202 of the gear shift lever 201 which is operatively connected to the button switch 103 disclosed in connection with FIG. 2. Thus on pressing of the button according to this invention the button switch 103 is closed.

Now in operation when the engine is running (i.e., the ignition switch is closed) electric current will be permitted to pass through the ignition switch 101 line 116 to the electronic control circuit 111 and the pressure switch 107. The pressure switch 107 is arranged to be sensitive to the pressure prevailing in the accumulator 135 operatively included in the transmission so that when a predetermined pressure or a pressure greater than said predetermined pressure prevails in the accumulator 135, the switch 107 is opened and and current is not permitted therethrough. However when the pressure in the accumulator 135 falls below the aforementioned predetermined pressure the switch 107 is arranged to be closed and current permitted to pass therethrough. During the time the switch 107 is closed current is permitted to pass through the coil 108 and thereby close the switch 110 which as previously described is sensitive to the energization of the coil 108. Thus upon closing of the switch 110 due to the energization of the coil 108 current is permitted to flow through the motor 104 to operate same. The motor 104 is connected to the pump 130 which supplies the pressurized fluid to the hydraulic control system of the transmission. Thus when the switch 107 is closed due to insufficient pressure in the accumulator, the switch 110 is closed via the energization of the coil 108 to start the motor 104 and pump fluid into said reservoir. Hence changing of the gears of the transmission is facilitated. Now when the ignition switch is opened, the second switch 102 is closed. However, unless both the pressure switch 107 and the button switch 103 are closed, the latter being closed upon pressing of the button 203, operation of the motor is not permitted. In the case that sufficient pressure is still stored in the accumulator to permit the changing of gears, the pressure switch 107 will remain open and the motor 104 remains inactive even if the button switch 103 is closed. However, if unsufficient pressure for this operation prevails in the accumulator 135 then the pressure switch 107 will close thus on pressing of the button 203 the motor 104 will be activated to return the pressure in the accumulator to the predetermined level. Simultaneously the pump 130 will supply sufficient pressurized fluid for the operation of the hydraulic control system of the transmission hence even if the engine is stopped, the gears of the transmission can be changed and the transmission engaged in either low or reverse gear. Thus the disadvantage of restarting the engine to change gears should the driver forget to do so before stopping the engine is completely eliminated.

Figure 4:
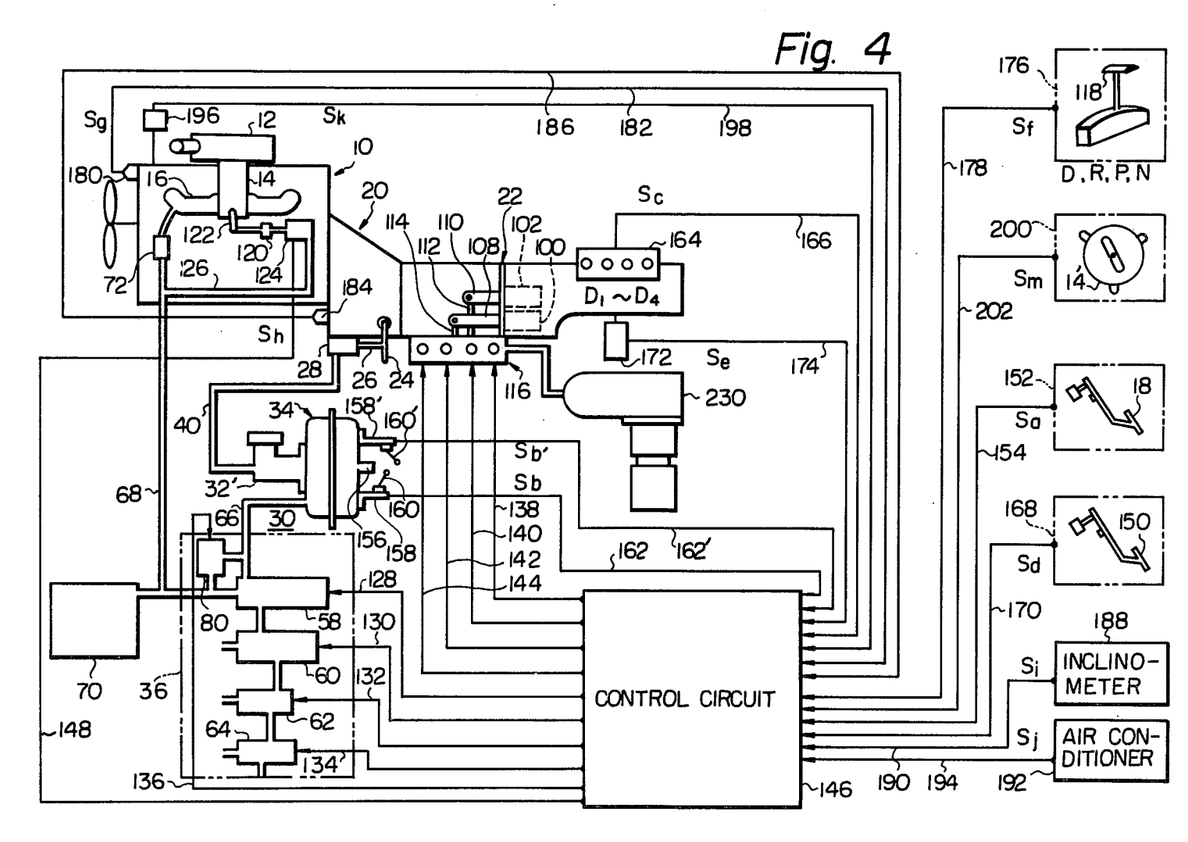
FIG. 4 shows schematically a system having an internal combustion engine equipped with clutch and countershaft type transmission to which the circuit shown in FIG. 2 is applicable.

Referring now to FIG. 4 wherein there is shown a system having an internal combustion engine, which in this figure is denoted by the numeral 10, connected in a well known manner to a clutch assembly denoted by 20. Following the clutch is a countershaft type transmission 22 (illustrated in FIGS. 7A to 7D). Since this combination of internal combustion engine clutch and stepped or countershaft transmission (as different from a planetary gear type transmission) is very well known, no further explanation is needed by one skilled in the art.

Indicated by the numerals 70, 34 and 36 is a vacuum servo system electrically connected to the control circuit 146 for control thereby. This vacuum servo system typifies the clutch control device shown in FIG. 2 denoted by the numeral 112. The control circuit 146 of course corresponds to the control circuit 111 in FIG. 2. The series of air bleeds 58, 60, 62 and 64 are opened and closed in accordance with signals from the control circuit 146 to control the vacuum fed from the reservoir 70 and induction manifold 16 to the vacuum servo 34 to subsequently supply hydraulic pressure to the clutch to open and close.

Generally indicated by the numeral 230 is an accumulator, pump and motor which correspond to the accumulator 135, pump 130 and motor 104 depicted in FIG. 2. The accumulator is shown communicating with a valve and servo arrangement generally indicated by the numeral 116. This arrangement is shown in detail in FIG. 6 wherein the previously described select cylinder, 1 and the shift cylinder 4 are shown but denoted in this figure by the numerals 242 and 240 respectively. The pump 244 illustrated in this figure (FIG. 6) is schematically represented and includes the electric motor 104 of FIG. 2.

Figure 6:
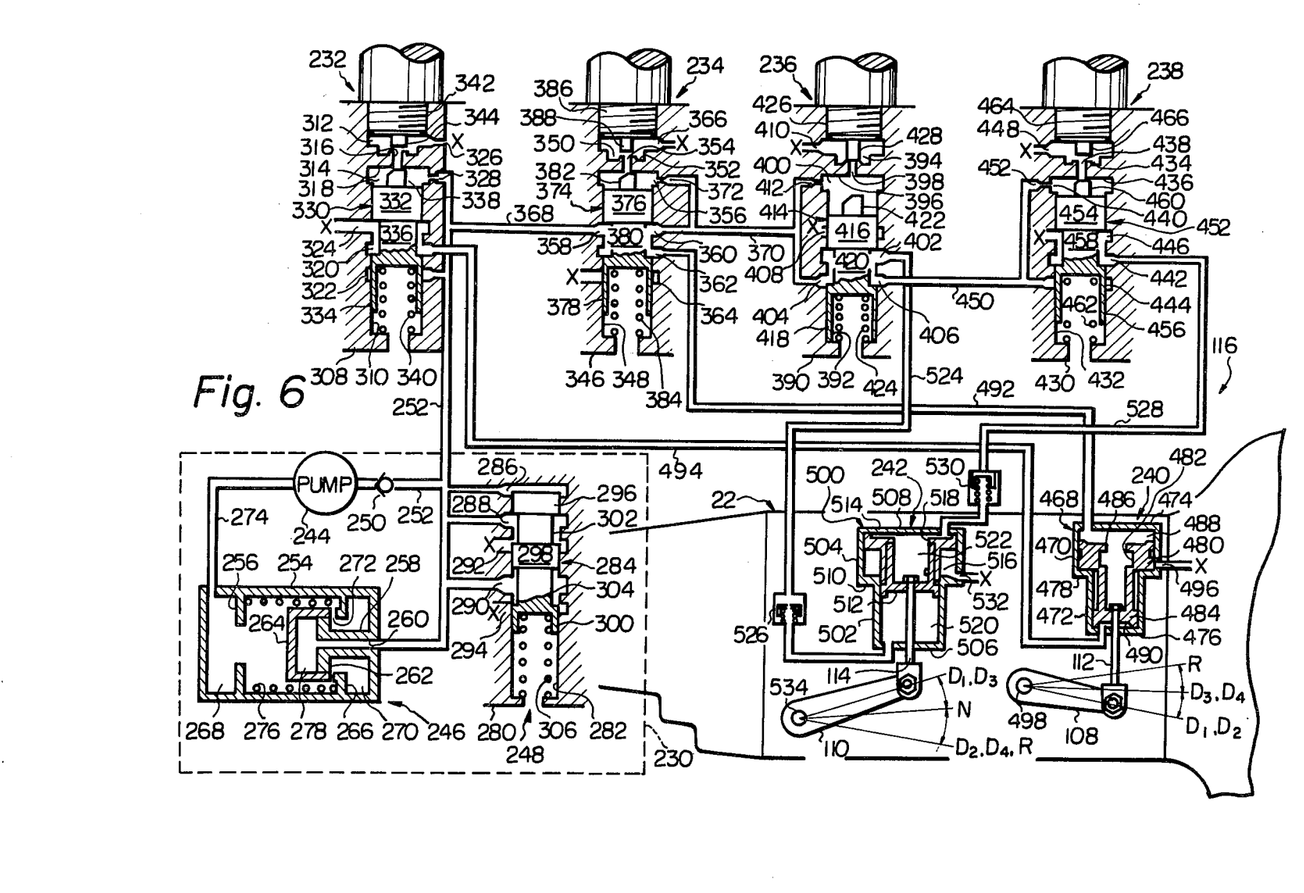
FIG. 6 shows the electrically controlled clutch control device shown in box form and generally denoted by numeral 112 in FIG. 2, and portion of which is shown in FIG. 1.
Figure 7A:
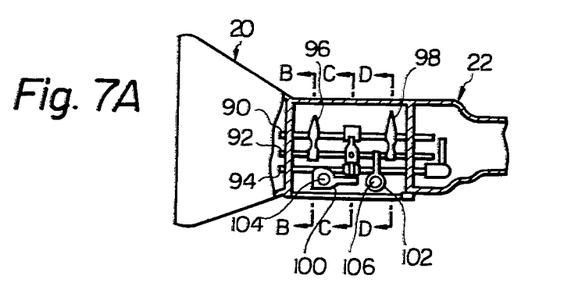
FIGS. 7A to 7D shown schematically sectional views of the countershaft transmission shown in FIGS. 1 and 4 (denoted by the numeral 20 in both figures).
Figure 7B:
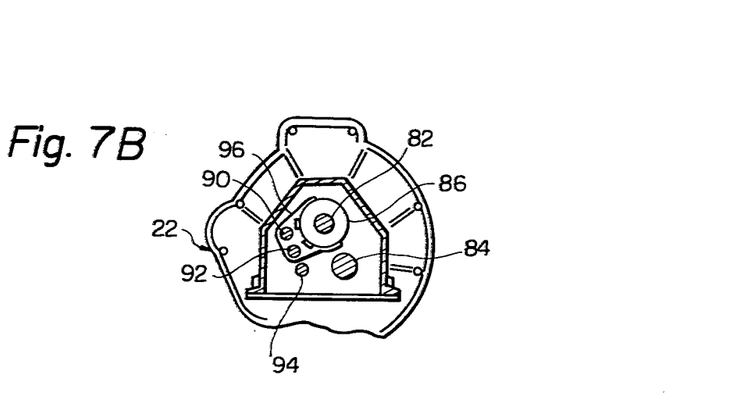
Figure 7C:
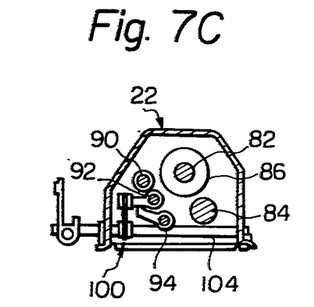
Figure 7D:
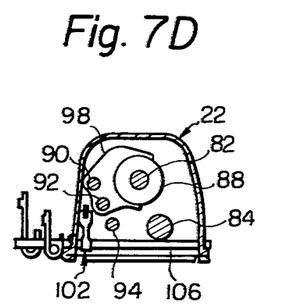

Referring now specifically to FIG. 6 it will be understood (when taken in conjunction with the aforementioned copending application) that hydraulic fluid under pressure is supplied from the pump 244, accumulator 246 and the valve 248 to the series of electromagnetically operated valves 232, 234, 236, and 238, which when selectively energized by signals from the control circuit 146 (FIG. 4) cause the pistons in the shift and select cylinders to reciprocate to move and select the gears of the countershaft transmission.

Figure 5:
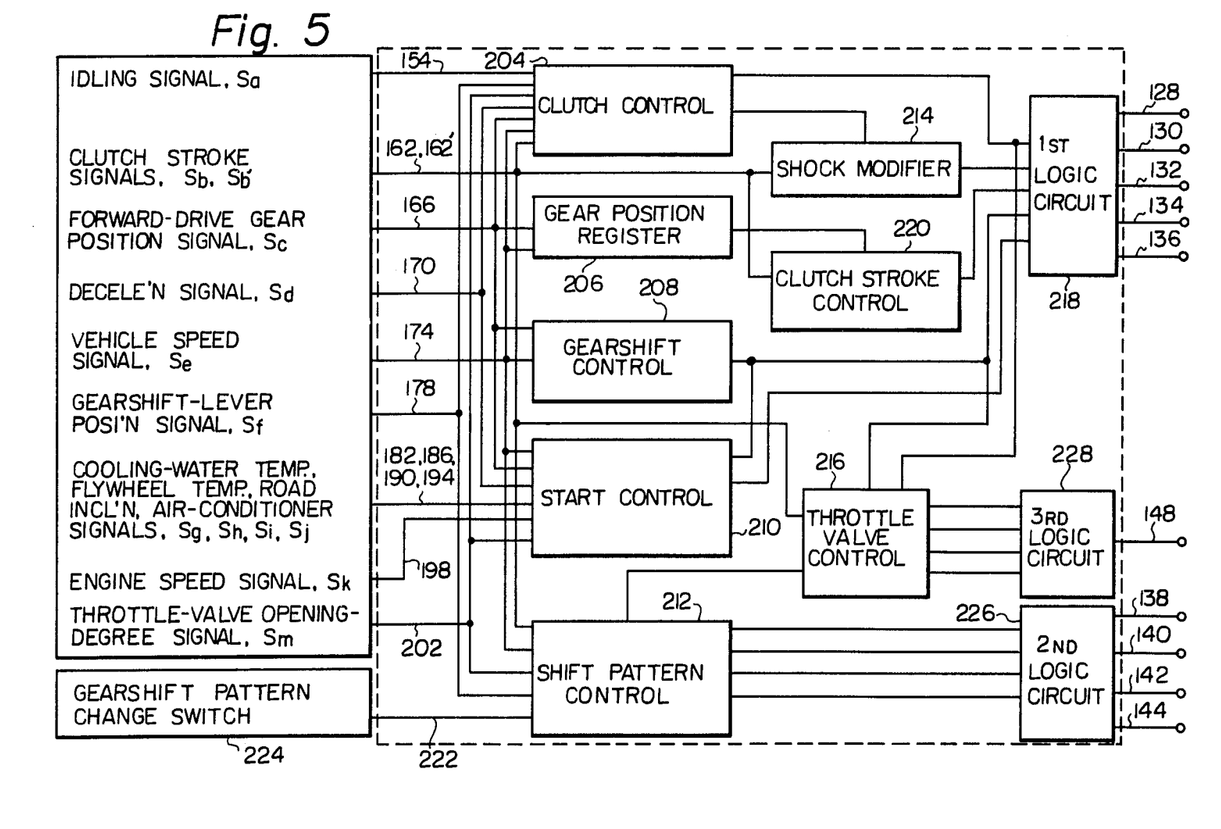
FIG. 5 shows in box diagram form the detailed arrangement of the electric control circuit denoted by numeral 111 in FIG. 2 and 146 in FIG. 4.

Attention is now directed to FIG. 5 wherein the control circuit 146 (111 in FIG. 2) is depicted in block diagram form. From FIG. 4 it will be understood that signals indicative of the various operating parameters of the engine and associated components are processed in the control circuit to result in the issuance of signals to selectively disengage and engage the clutch and to selectively shift the gears of the transmission. For a detailed explanation of the operation of the components of this figure (and FIGS. 4, 6 and 7A to 7D) attention is directed to the aforementioned copending application.

What is claimed is:
1. An automatic countershaft power transmission for an automotive vehicle, said automotive vehicle being equipped with an internal combustion engine and an ignition switch, said automatic countershaft power transmission comprising:
   a clutch assembly operatively connected to said internal combustion engine;
   a countershaft gear assembly operatively connected to said clutch assembly;
   hydraulic control means operatively connected to said countershaft gear assembly for selectively engaging the gears of said countershaft gear assembly, said hydraulic control means including a pump and an electric motor for driving said pump, said electric motor being electrically coupled with said ignition switch to receive electric power when the ignition switch is closed; and
   means for selectively bypassing said ignition switch and directing electric power to said electric motor so that shifting of said gears of said countershaft gear assembly is possible when said ignition switch is open and said internal combustion engine is stopped, said bypassing means including one switch which is closed by opening of the ignition switch and another manually operated switch, said other switch being connected in series with said one switch.

2. An automatic countershaft power transmission for an automotive vehicle, said automotive vehicle being equipped with an internal combustion engine and said automatic countershaft power transmission comprising in combination;
   a countershaft transmission gear assembly said gear assembly having a gear shift lever operatively connected thereto;
   a clutch assembly operatively disposed between the internal combustion engine and said countershaft gear assembly;

electrically operated clutch control valve means operatively connected to said clutch assembly for opening and closing same;

electrically operated hydraulic control means operatively connected to said countershaft gear assembly for selectively engaging the gears thereof;

an electric control circuit responsive to the position of said gear shift lever and various operating parameters of said vehicle for producing electrical signals to control said clutch control valve means and said hydraulic control means in accordance with said gear shift lever position and said operating parameters;

a pump;

an accumulator fluidly connected to said pump for receiving pressurized fluid therefrom, the combination of the pump and the accumulator being operatively connected to said electrically operated hydraulic control means;

an ignition switch;

a second switch which is so constructed and arranged as to take an open position when said ignition switch takes a closed position and take a closed position when said ignition switch takes an open position;

a motor drivingly connected to said pump;

said ignition switch, second switch and said motor being connected in parallel between first and second power lines;

said electric control circuit being connected in series between said ignition switch and said electrically operated clutch control valve means and said electrically operated hydraulic control means, said electrically operated clutch control valve means and said electrically operated hydraulic control means being connected in parallel between said electric control circuit and said second power supply line;

a button switch operatively connected to a button disposed on said gear shift lever which is so constructed and arranged as to take a closed position when said button is depressed;

a pressure responsive switch sensitive to the pressure prevailing and accumulator and so constructed and arranged as to take a closed position when said pressure in said accumulator is below a predetermined level and taken an open position when said pressure is above said predetermined level;

a coil; said button switch, pressure responsive switch and said coil being connected in series between said second switch and said second power supply line;

a third switch connected in series between said motor and said second power supply line, said third switch being sensitive to the energization of said coil and arranged to take a closed position when said coil is energized and taken an open position when said coil is deenergized;

the arrangement of the foregoing being such that the gears of said countershaft transmission are shiftable when the ignition switch takes in either the open or closed positions due to the provision of the second switch which, in the case of the ignition switch being open, permits upon closing of said button switch, closing of said third switch and activation of said motor.

3. An automatic countershaft power transmission for an automotive vehicle, said automotive vehicle being equipped with an internal combustion engine and said automatic countershaft power transmission having;

a countershaft transmission gear assembly, said gear assembly having a gear shift lever operatively connected thereto;

a clutch assembly operatively disposed between the internal combustion engine and said countershaft gear assembly;

electrically operated clutch control valve means operatively connected to said clutch assembly for opening and closing same;

electrically operated hydraulic control means operatively connected to said countershaft gear assembly for selectively engaging the gears thereof;

an electric control circuit responsive to the position of said gear shift lever and various operating parameters of said vehicle for producing electrical signals to control said clutch valve means and said hydraulic control means in accordance with said gear shift lever position and said operating parameters;

a pump;

an accumulator fluidly connected to said pump for receiving pressurized fluid therefrom, the combination of the pump and the accumulator being operatively connected to said electrically operated hydraulic control means;

an ignition switch;

a motor drivingly connected to said pump;

said ignition switch and said motor being connected in parallel between first and second power lines;

said electric control circuit being connected in series between said ignition switch and said electrically operated clutch control valve means and said electrically operated hydraulic control means, said electrically operated clutch control valve means and said electrically operated hydraulic control means being connected in parallel between said electric control circuit and said second power supply line;

a pressure responsive switch sensitive to the pressure prevailing said accumulator and so constructed and arranged as to take a closed position when said pressure in said accumulator is below a predetermined level and take an open position when said pressure is above said predetermined level;

a coil; said pressure responsive switch and said coil being connected in series between said first and said second power supply lines;

a third switch connected in series between said motor and said second power supply line, said third switch being sensitive to the energization of said coil and arranged to take a closed position when said coil is energized and take an open position when said coil is deenergized;

a second switch operatively connected to said ignition switch is so constructed and arranged as to take an open position when said ignition switch takes a closed position and take a closed position when said ignition switch takes an open position, said second switch being electrically interposed between said first power supply line and said pressure sensitive switch; and a button switch so constructed and arranged to be responsive to a button operatively disposed on said gear shift lever and to take a closed position upon depression of said button, said button switch being electrically interposed between said second switch and said pressure responsive switch;

the arrangement of the foregoing being such that the gears of said countershaft power transmission are shiftable when the ignition switch is closed and the pressure prevailing in said accumulator is below said predetermined level due to the provision of said second switch which permits said coil to be energized to close said third switch and activate said motor upon closing of said button switch.

4. In an automatic transmission having a gear shift lever provided with a manually depressable button, an accumulator, a pump for delivering hydraulic fluid to the accumulator, an electric motor for driving the pump when energized, a first circuit including a relay switch for supplying electric current to the electric motor to energize the same when said relay switch is closed, the relay switch having a relay coil, first switch means responsive to hydraulic pressure within the accumulator, the first switch means being electrically connected in series with the relay coil and being operative to be closed when the hydraulic pressure is lower than a predetermined level, and an ignition switch connected in series with the first switch means, the improvement comprising in combination with the ignition switch and the first switch means:

series connected second and third switch means electrically connected in parallel with said ignition switch, said second switch means being operatively associated with said ignition switch such that said second switch means is closed when said ignition switch is open, and said third switch means being operatively associated with said manually depressable button such that said third switch means is closed when said button is manually depressed.

5. An automatic countershaft power transmission for an automotive vehicle, said automotive vehicle being equipped with an internal combustion engine and an ignition switch, said automatic countershaft power transmission comprising:

a clutch assembly operatively connected to said internal combustion engine;

a countershaft gear assembly operatively connected to said clutch assembly;

hydraulic control means operatively connected to said countershaft gear assembly for selectively engaging the gears of said countershaft gear assembly, said hydraulic control means including a pump and an electric motor driven by said pump, said electric motor being electrically coupled with said ignition switch to receive electric power when the ignition switch is closed; and means for selectively bypassing said ignition switch and directing electric power to said electric motor so that shifting of said gears of said countershaft gear assembly is possible when said ignition switch is open and said internal combustion engine is stopped;

said gear assembly having a gear shift lever operatively connected thereto;

said hydraulic control means comprising:

electrically operated clutch control valve means operatively connected to said clutch assembly for opening and closing same;

electrically operated hydraulic control means operatively connected to said countershaft gear assembly for selectively engaging the gears thereof;

an electric control circuit responsive to the position of said gear shift lever and various operating parameters of said vehicle for producing electrical signals to control said clutch valve means and said hydraulic control means in accordance with said gear shift lever position and said operating parameters;

an accumulator fluidly connected to said pump for receiving pressurized fluid therefrom, the combination of the pump and the accumulator being operatively connected to said electrically operated hydraulic control means;

said ignition switch and said motor being connected in parallel between first and second power lines;

said electric control circuit being connected in series between said ignition switch and said electrically operated clutch control valve means and said electrically operated hydraulic control means, said electrically operated clutch control valve means and said electrically operated hydraulic control means being connected in parallel between said electric control circuit and said second power supply line;

a pressure responsive switch sensitive to the pressure prevailing said accumulator and so constructed and arranged as to take a closed position when said pressure in said accumulator is below a predetermined level and take an open position when said pressure is above said predetermined level;

a coil; said pressure responsive switch and said coil being connected in series between said first and said second power supply lines;

a third switch connected in series between said motor and said second power supply line, said third switch being sensitive to the energization of said coil and arranged to take a closed position when said coil is energized and take an open position when said coil is deenergized;

said means for selectively bypassing said ignition switch and directing electric power to said electric motor comprising:

a second switch operatively connected to said ignition switch which is so constructed and arranged as to take an open position when said ignition switch takes a closed position and take a closed position when said ignition switch takes an open position, said second switch being electrically interposed between said first power supply line and said pressure sensitive switch; and a button switch so constructed and arranged to be responsive to a button operatively disposed on said gear shift lever and to take a closed position upon depression of said button, said button switch being electrically interposed between said second switch and said pressure responsive switch;

the arrangement of the foregoing being such that the gears of said countershaft power transmission are shiftable when the ignition switch is open and the pressure prevailing in said accumulator is below said predetermined level due to the provision of said second switch which permits said coil to be energized to close said third switch and activate said motor upon closing of said button switch.

* * * * *